(12) United States Patent
Rudman et al.

(10) Patent No.: US 10,514,832 B2
(45) Date of Patent: *Dec. 24, 2019

(54) METHOD FOR LOCATING REGIONS OF INTEREST IN A USER INTERFACE

(71) Applicant: THOMSON Licensing, Issy-les-Moulineaux (FR)

(72) Inventors: Kenneth Rudman, South Pasadena, CA (US); Vasil Nadzakov, Beverly Hills, CA (US); Andrew Yoon, Los Angeles, CA (US); Roger Yeh, San Marino, CA (US); Basil Badawiyeh, Santa Clarita, CA (US); Genevieve Marie Pinvidic, Burbank, CA (US); Dana Forte, Castaic, CA (US); Dan Han Diep, San Gabriel, CA (US); Samir Ahmed, Culver City, CA (US); Lee Shartzer, Valencia, CA (US); John Frederick Bishop, Santa Monica, CA (US); James Booth, Burbank, CA (US); Hao Chi Tran, El Monte, CA (US); Peter Lee, Calabasas Park, CA (US); Gregory Gudorf, San Diego, CA (US); Douglas Jason Pickersgill, Los Angeles, CA (US); Mark Walker, Castaic, CA (US); David Pettigrew, San Francisco, CA (US)

(73) Assignee: Thomson Licensing, Cesson-Sevigne (FR)

(*) Notice: Subject to any disclaimer, the term of this patent is extended or adjusted under 35 U.S.C. 154(b) by 48 days.

This patent is subject to a terminal disclaimer.

(21) Appl. No.: 15/971,020

(22) Filed: May 4, 2018

(65) Prior Publication Data
US 2018/0253203 A1    Sep. 6, 2018

Related U.S. Application Data

(63) Continuation of application No. 13/993,939, filed as application No. PCT/US2011/066004 on Dec. 20, 2011, now Pat. No. 9,990,112.
(Continued)

(51) Int. Cl.
G06F 3/048 (2013.01)
G06F 3/0484 (2013.01)
(Continued)

(52) U.S. Cl.
CPC .......... *G06F 3/0484* (2013.01); *G06F 3/0482* (2013.01); *G06F 3/0485* (2013.01);
(Continued)

(58) Field of Classification Search
None
See application file for complete search history.

(56) References Cited

U.S. PATENT DOCUMENTS 5,491,795 A    2/1996  Beaudet et al.
5,499,334 A    3/1996  Staab
(Continued)

FOREIGN PATENT DOCUMENTS

CN    101617288    12/2009
JP    6332661      12/1994
(Continued)

OTHER PUBLICATIONS

International Search Report dated Apr. 24, 2012.

*Primary Examiner* — Hua Lu
(74) *Attorney, Agent, or Firm* — Vincent Edward Duffy

(57) ABSTRACT

The present disclosure is directed towards having a user interface that displays a number of cards or windows. A user can implement a command where the user interface will automatically change the position of the displayed cards to
(Continued)

show regions of interest which are the parts of the cards that a user may have interested in. The user interest can be determined in accordance with user preference information. Optionally, cards which do not have regions of interest are removed from a display area and such cards are replaced with new cards that do have regions of interest.

18 Claims, 12 Drawing Sheets

Related U.S. Application Data

(60) Provisional application No. 61/429,741, filed on Jan. 4, 2011, provisional application No. 61/426,509, filed on Dec. 22, 2010.

(51) Int. Cl.

| | | |
|---|---|---|
| G06F 16/44 | (2019.01) | |
| G06F 16/438 | (2019.01) | |
| G06F 3/0482 | (2013.01) | |
| G11B 27/034 | (2006.01) | |
| G11B 27/10 | (2006.01) | |
| G06F 3/0488 | (2013.01) | |
| G06F 3/0485 | (2013.01) | |

(52) U.S. Cl.
CPC ...... G06F 3/04842 (2013.01); G06F 3/04883 (2013.01); G06F 16/4387 (2019.01); G06F 16/444 (2019.01); G11B 27/034 (2013.01); G11B 27/105 (2013.01); G06F 2203/04806 (2013.01)

(56) References Cited

U.S. PATENT DOCUMENTS

| | | | | |
|---|---|---|---|---|
| 6,538,672 | B1* | 3/2003 | Dobbelaar | H04N 5/44543 348/E5.105 |
| 6,690,391 | B1* | 2/2004 | Proehl | G06F 3/0362 715/720 |
| 7,426,467 | B2* | 9/2008 | Nashida | H04L 12/2805 704/275 |
| 7,698,658 | B2 | 4/2010 | Ohwa et al. | |
| 8,564,543 | B2 | 10/2013 | Chaudhri | |
| 2003/0001898 | A1* | 1/2003 | Bernhardson | G06F 3/0481 715/786 |
| 2003/0001907 | A1* | 1/2003 | Bergsten | G06F 3/0482 715/853 |
| 2003/0156141 | A1 | 8/2003 | Good et al. | |
| 2005/0257152 | A1 | 11/2005 | Shimizu et al. | |
| 2006/0048076 | A1 | 3/2006 | Vronay et al. | |
| 2006/0195789 | A1 | 8/2006 | Rogers et al. | |
| 2007/0082707 | A1 | 4/2007 | Flynt et al. | |
| 2007/0245263 | A1 | 10/2007 | Hale et al. | |
| 2008/0059884 | A1* | 3/2008 | Ellis | H04N 5/44543 715/721 |
| 2008/0071827 | A1 | 3/2008 | Hengel et al. | |
| 2008/0159708 | A1 | 7/2008 | Kazama et al. | |
| 2008/0165141 | A1 | 7/2008 | Christie | |
| 2008/0168403 | A1 | 7/2008 | Westerman et al. | |
| 2008/0209468 | A1 | 8/2008 | Milosevski | |
| 2009/0070363 | A1 | 3/2009 | Bull et al. | |
| 2009/0204925 | A1 | 8/2009 | Bhat et al. | |
| 2009/0241061 | A1* | 9/2009 | Asai | G01C 21/3611 715/808 |
| 2009/0300497 | A1* | 12/2009 | Billmaier | G06F 3/0482 715/716 |
| 2009/0313295 | A1* | 12/2009 | Blaxland | G06Q 30/02 |
| 2010/0001960 | A1 | 1/2010 | Williams | |
| 2010/0095240 | A1* | 4/2010 | Shiplacoff | G06F 3/0483 715/784 |
| 2010/0131844 | A1 | 5/2010 | Wohlert | |
| 2010/0162160 | A1 | 6/2010 | Stallings et al. | |
| 2010/0205563 | A1 | 8/2010 | Haapsaari et al. | |
| 2010/0211872 | A1* | 8/2010 | Rolston | G06F 3/0482 715/702 |
| 2010/0229130 | A1 | 9/2010 | Edge et al. | |
| 2010/0262938 | A1* | 10/2010 | Woods | G06T 15/20 715/850 |
| 2010/0274674 | A1 | 10/2010 | Roberts et al. | |
| 2010/0313110 | A1 | 12/2010 | Claridge et al. | |
| 2011/0047504 | A1 | 2/2011 | Wienands et al. | |
| 2011/0107369 | A1* | 5/2011 | O'Brien | G11B 27/034 725/38 |
| 2011/0202834 | A1 | 8/2011 | Mandryk et al. | |
| 2012/0102437 | A1 | 4/2012 | Worley et al. | |

FOREIGN PATENT DOCUMENTS

| | | |
|---|---|---|
| JP | 2005037142 | 2/2005 |
| JP | 2005267390 | 9/2005 |
| JP | 2005354684 | 12/2005 |
| JP | 2006209563 | 8/2006 |
| JP | 2008167082 | 7/2008 |
| JP | 2006301871 | 11/2008 |
| JP | 2009224998 | 10/2009 |
| JP | 2009253618 | 10/2009 |
| JP | 2010503130 | 1/2010 |
| WO | WO2009143076 | 11/2009 |

* cited by examiner

METHOD FOR LOCATING REGIONS OF INTEREST IN A USER INTERFACE

CROSS REFERENCE TO RELATED APPLICATIONS

This application claims the benefit, under 35 U.S.C. § 120, of U.S. patent application Ser. No. 13/993,939 filed Jan. 29, 2014, which claims the benefit, under 35 U.S.C. § 365 of International Application PCT/US2011/066004 filed Dec. 20, 2011 which was published in accordance with PCT Article 21(2) on Jun. 28, 2012 in English and which claims the benefit of U.S. provisional patent applications No. 61/426,509 filed Dec. 22, 2010 and 61/429,741 filed Jan. 4, 2011.

TECHNICAL FIELD

A user interface is used for displaying multiple windows/cards. More particularly, the present disclosure is for a method for generating a user interface to locate various regions of interest across multiple cards with little user input.

BACKGROUND OF THE INVENTION

When using a media device such as a computer or a tablet, it is very likely that a user will have multiple windows of content open at one time. These windows are typically manipulated in a way where a user has to scroll through each window or card individually to find specific areas or topics of interest. Such a task becomes cumbersome when a user wants to find their items of interest quickly when going through cards/windows but the display interface only accommodates several cards and/or such cards have areas that exceed the displayable area of the media device.

SUMMARY OF THE INVENTION

A method is presented whereby various regions of interest are automatically shown to a user in response to the activation of an interest feature. Multiple windows or cards are rearranged in a displayable area so that region of interest for each card or window is shown without requiring a user to manipulate such cards/windows individually.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DETAILED DESCRIPTION

The present invention provides several different embodiments of a user interface that is used for receiving, recording, playing back, purchasing, and the like media such as videos, television shows, movies, audio, music, video games, and the like. Such a user interface can be implemented on devices such as a computer, set top box, media server, tablet, mobile phone, personal media, device, portable video game system, video game system, and so forth.

Figure 1:
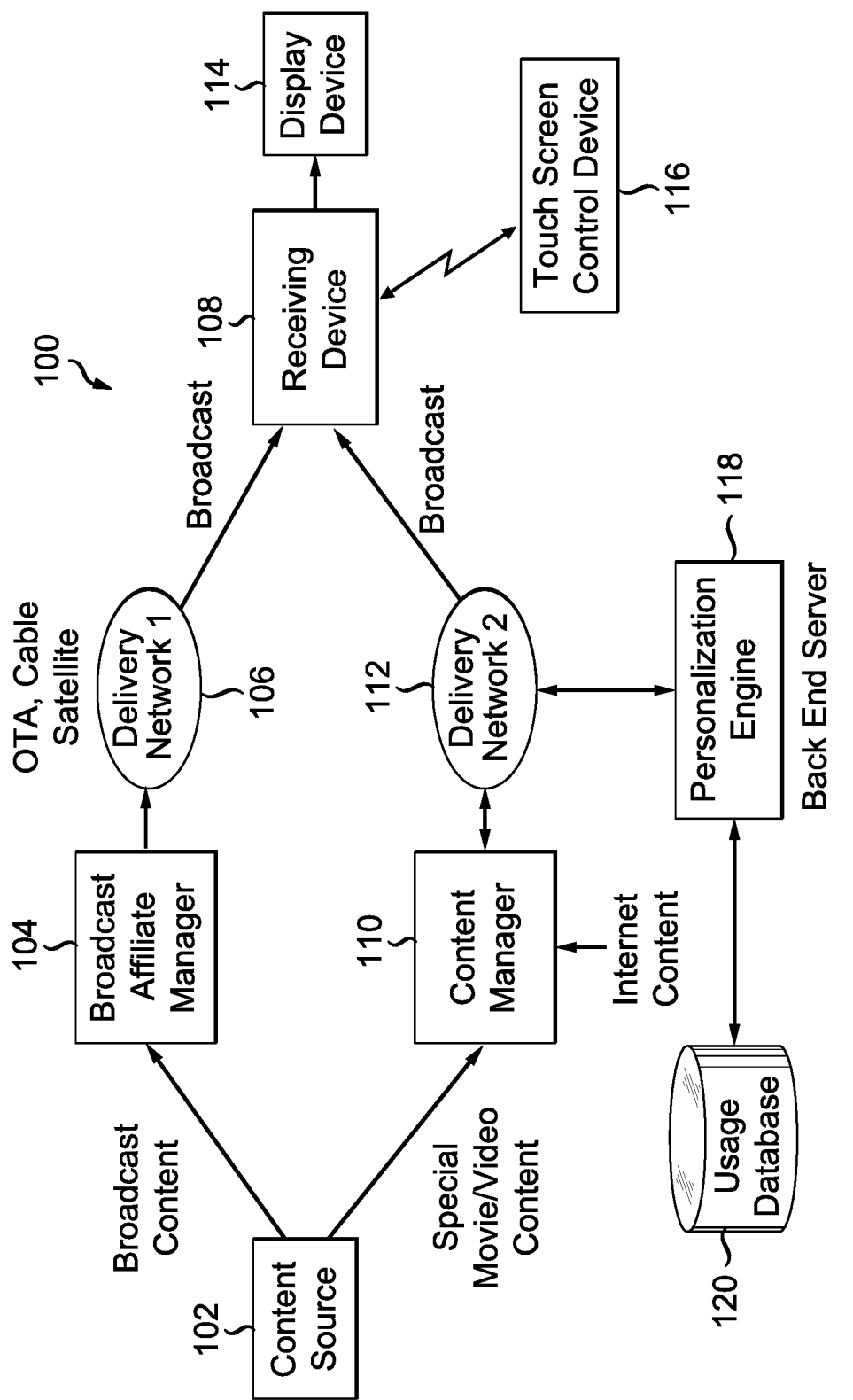
FIG. 1 is a block diagram of an exemplary system for delivering video content in accordance with the present disclosure.

Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a media device 108 in a user's home, where the content will subsequently be searched by the user. It is to be appreciated that the media device 108 can take many forms and may be embodied as a set top box/digital video recorder (DVR), a gateway, a modem, etc. Further, the media device 108 may act as entry point, or gateway, for a home network system that includes additional devices configured as either client or peer devices in the home network.

A second form of content is referred to as special content. Special content may include content delivered as premium viewing, pay-per-view, or other content otherwise not provided to the broadcast affiliate manager, e.g., movies, video games or other video elements. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's media device 108 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106). In addition, the user may also obtain content directly from the Internet via delivery network 2 (112) without necessarily having the content managed by the content manager 110.

Several adaptations for utilizing the separately delivered content may be possible. In one possible approach, the special content is provided as an augmentation to the broadcast content, providing alternative displays, purchase and merchandising options, enhancement material, etc. In another embodiment, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

The media device 108 may receive different types of content from one or both of delivery network 1 and delivery network 2. The media device 108 processes the content, and provides a separation of the content based on user preferences and commands. The media device 108 may also include a storage device, such as a hard drive or optical disk drive, for recording and playing back audio and video content. Further details of the operation of the media device 108 and features associated with playing back stored content will be described below in relation to FIG. 2. The processed content is provided to a display device 114. The display device 114 may be a conventional 2-D type display or may alternatively be an advanced 3-D display.

The media device 108 may also be interfaced to a second screen such as a touch screen control device 116. The touch screen control device 116 may be adapted to provide user control for the media device 108 and/or the display device 114. The touch screen device 116 may also be capable of displaying video content. The video content may be graphics entries, such as user interface entries, or may be a portion of the video content that is delivered to the display device 114 The touch screen control device 116 may interface to media device 108 using any well known signal transmission system, such as infra-red (IR) or radio frequency (RF) communications and may include standard protocols such as infra-red data association (IRDA) standard, Wi-Fi, Bluetooth and the like, or any other proprietary protocols. Operations of touch screen control device 116 will be described in further detail below.

Optionally, media device 108 and touch screen control device 116 can be integrated into the same device. Examples of these media devices with a touch screen include computers, laptops, cell phones, personal media player, MP3 players, personal desk assistants, tablet devices, digital video recorders, and the like. For purposes of the this specification, the term media device 108 can encompass all of these type of devices with set top boxes, digital video recorders, gateway devices, and the like.

In the example of FIG. 1, the system 100 also includes a back end server 118 and a usage database 120. The back end server 118 includes a personalization engine that analyzes the usage habits of a user and makes recommendations based on those usage habits. The usage database 120 is where the usage habits for a user are monitored and information about such usage habits is stored. It is possible to use such user habit information to develop a profile for a user which is then used for recommending advertisements and programming. In some cases, the usage database 120 may be part of the back end server 118. In the present example, the back end server 118 (as well as the usage database 120) is connected to the system the system 100 and accessed through the delivery network 2 (112).

Figure 2:
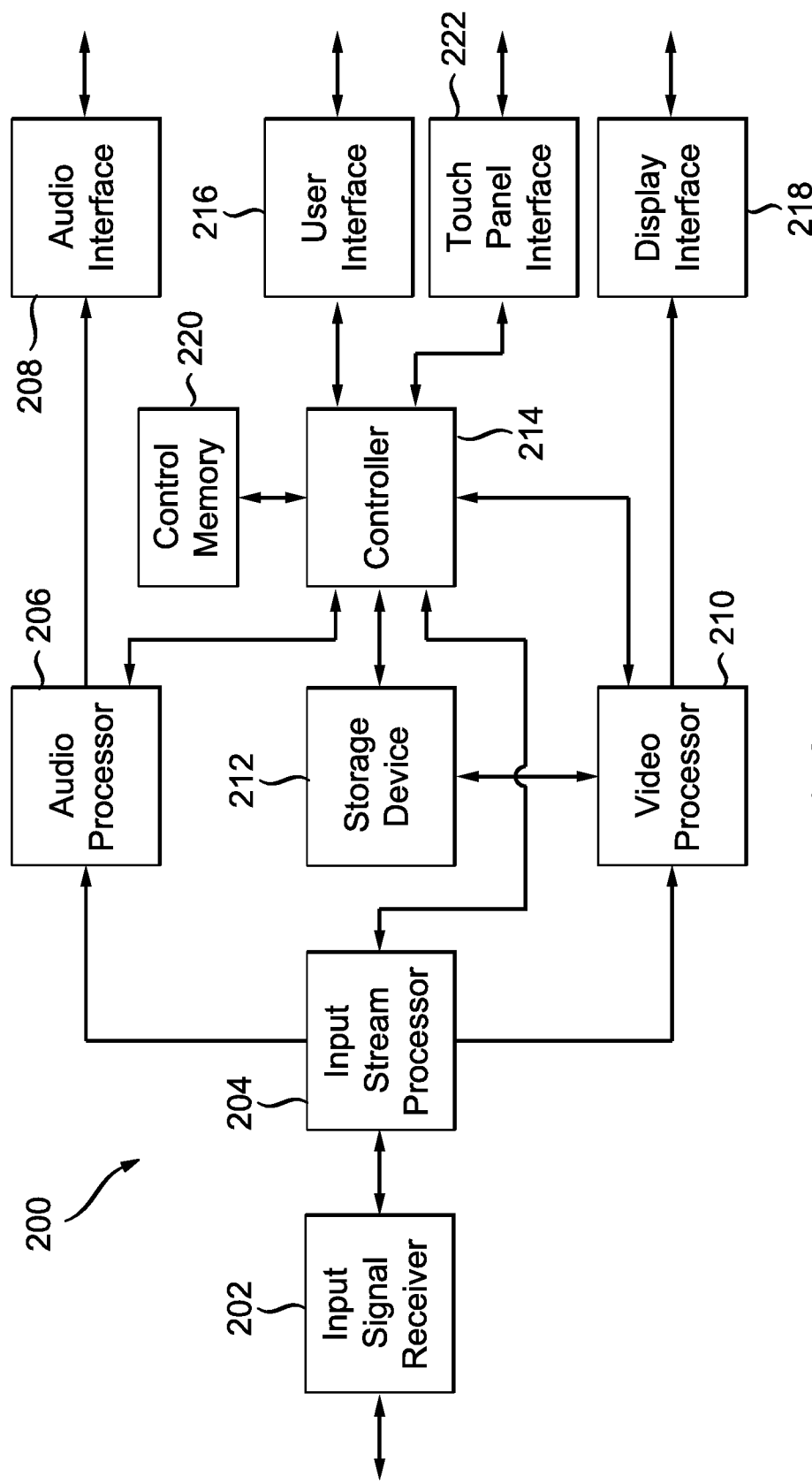
FIG. 2 is a block diagram of an exemplary set-top box/digital video recorder (DVR) as a media device in accordance with the present disclosure.

Turning now to FIG. 2, a block diagram of an embodiment of a media device 200 is shown. Receiving device 200 may operate similar to the media device described in FIG. 1 and may be included as part of a gateway device, modem, set-top box, or other similar communications device. The device 200 shown may also be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved by the input signal receiver 202 based on user input provided through a control interface or touch panel interface 222. Touch panel interface 222 may include an interface for a touch screen device. Touch panel interface 222 may also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 may provide a digital signal to an audio output device or display device using a High- Definition Multimedia Interface (HDMI) cable or alternate audio interface such as via a Sony/Philips Digital Interconnect Format (SPDIF). The audio interface may also include amplifiers for driving one more sets of speakers. The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 may be a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as HDMI. It is to be appreciated that the display interface 218 will generate the various screens for presenting the search results in a three dimensional gird as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content and the creation and adjusting of the gird display representing the content, either stored or to be delivered via the delivery networks, described above.

The controller 214 is further coupled to control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 may store instructions for controller 214. Control memory may also store a database of elements, such as graphic elements containing content, various graphic elements used for generating a displayed user interface for display interface 218, and the like. Alternatively, the memory may store the graphic elements in identified or grouped memory locations and use an access or location table to identify the memory locations for the various portions of information related to the graphic elements. In addition, various graphic elements can be generated in response to computer instructions interpreted by controller 214 for output to display interface 218. Additional details related to the storage of the graphic elements will be described below. Further, the implementation of the control memory 220 may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

Optionally, controller 214 can be adapted to extract metadata from audio and video media by using audio processor 206 and video processor 210, respectively. That is, metadata that is contained in video signal in the vertical blanking interval, auxiliary data fields associated with video, or in other areas in the video signal can be harvested by using the video processor 210 with controller 214 as to generate metadata that can be used for functions such as generating an electronic program guide, have descriptive information about received video, supporting an auxiliary information service, and the like. Similarly, the audio processor 206 working with controller 214 can be adapted to recognize audio watermarks that may be in an audio signal. Such audio watermarks can then be used to perform some action such as the recognition of the audio signal, security which identifies the source of an audio signal, or perform some other service. Furthermore, metadata to support the actions listed above can come from a network source which are processed by controller 214.

Figure 3:
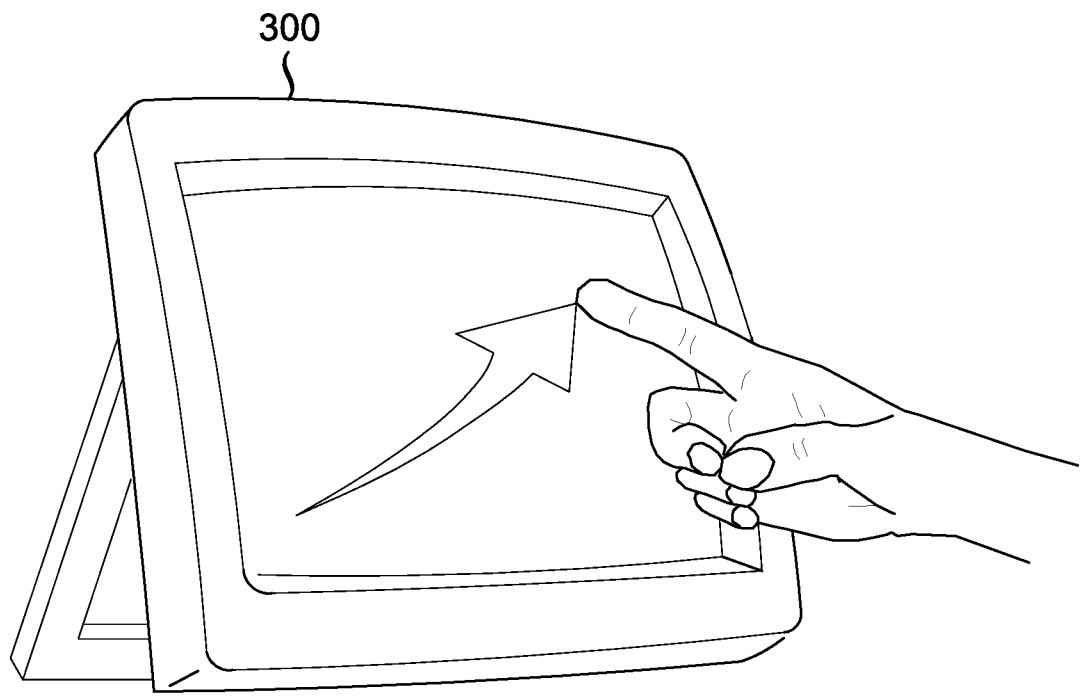
FIG. 3 is a perspective view of an exemplary media device in accordance with an embodiment of the present disclosure.

Turning now to FIG. 3, the user interface process of the present disclosure employs an input device that can be used to express functions, such as fast forward, rewind, etc. To allow for this, a tablet or touch panel device 300 (which is the same as the touch screen device 116 shown in FIG. 1 and/or is an integrated example of media device 108 and touch screen device 116) may be interfaced via the user interface 216 and/or touch panel interface 222 of the receiving device 200. The touch panel device 300 allows operation of the receiving device or set top box based on hand movements, or gestures, and actions translated through the panel into commands for the set top box or other control device. In one embodiment, the touch panel 300 may simply serve as a navigational tool to navigate the grid display. In other embodiments, the touch panel 300 will additionally serve as the display device allowing the user to more directly interact with the navigation through the grid display of content. The touch panel device may be included as part of a remote control device containing more conventional control functions such as activator buttons. The touch panel 300 can also includes at least one camera element. As described in further detail below, content displayed on the touch panel device 300 may be zapped or thrown to the main screen (e.g., display device 114 shown in FIG. 1).

Figure 4:
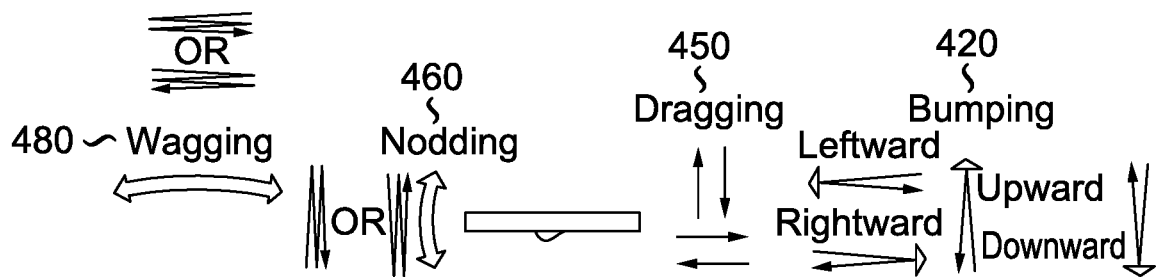
FIG. 4 illustrates an exemplary embodiment of the use of a gestures for a sensing controller or touch screen in accordance with the present disclosure.

Turning now to FIG. 4, the use of a gesture sensing controller or touch screen, such as shown, provides for a number of types of user interaction. The inputs from the controller are used to define gestures and the gestures, in turn, define specific contextual commands. The configuration of the sensors may permit defining movement of a user's fingers on a touch screen or may even permit defining the movement of the controller itself in either one dimension or two dimensions. two-dimensional motion, such as a diagonal, and a combination of yaw, pitch and roll can be used to define any three-dimensional motion, such as a swing. A number of gestures are illustrated in FIG. 4. Gestures are interpreted in context and are identified by defined movements made by the user.

Bumping 420 is defined by a two-stroke drawing indicating pointing in one direction, either up, down, left or right. The bumping gesture is associated with specific commands in context. For example, in a TimeShifting mode, a left-bump gesture 420 indicates rewinding, and a right-bump gesture indicates fast-forwarding. In other contexts, a bump gesture 420 is interpreted to increment a particular value in the direction designated by the bump. Checking 440 is defined as in drawing a checkmark. It is similar to a downward bump gesture 420. Checking is identified in context to designate a reminder, user tag or to select an item or element. Circling 440 is defined as drawing a circle in either direction. It is possible that both directions could be distinguished. However, to avoid confusion, a circle is identified as a single command regardless of direction. Dragging 450 is defined as an angular movement of the controller (a change in pitch and/or yaw) while pressing a button (virtual or physical) on the tablet 300 (i.e., a "trigger drag"). The dragging gesture 450 may be used for navigation, speed, distance, time-shifting, rewinding, and forwarding. Dragging 450 can be used to move a cursor, a virtual cursor, or a change of state, such as highlighting outlining or selecting on the display. Dragging 450 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 460 is defined by two fast trigger-drag up-and-down vertical movements. Nodding 460 is used to indicate "Yes" or "Accept." X-ing 470 is defined as in drawing the letter "X." X-ing 470 is used for "Delete" or "Block" commands. Wagging 480 is defined by two trigger-drag fast back-and-forth horizontal movements. The wagging gesture 480 is used to indicate "No" or "Cancel."

Depending on the complexity of the sensor system, only simple one dimensional motion or gestures may be allowed. For instance, a simple right or left movement on the sensor as shown here may produce a fast forward or rewind function. In addition, multiple sensors could be included and placed at different locations on the touch screen. For instance, a horizontal sensor for left and right movement may be placed in one spot and used for volume up/down, while a vertical sensor for up down movement may be place in a different spot and used for channel up and down. In this way specific gesture mappings may be used. As discussed in further detail below, a two finger swipe gesture may be utilized to initiate the throwing or moving of content from the tablet 300 to the main screen or display device 114.

Figure 5:
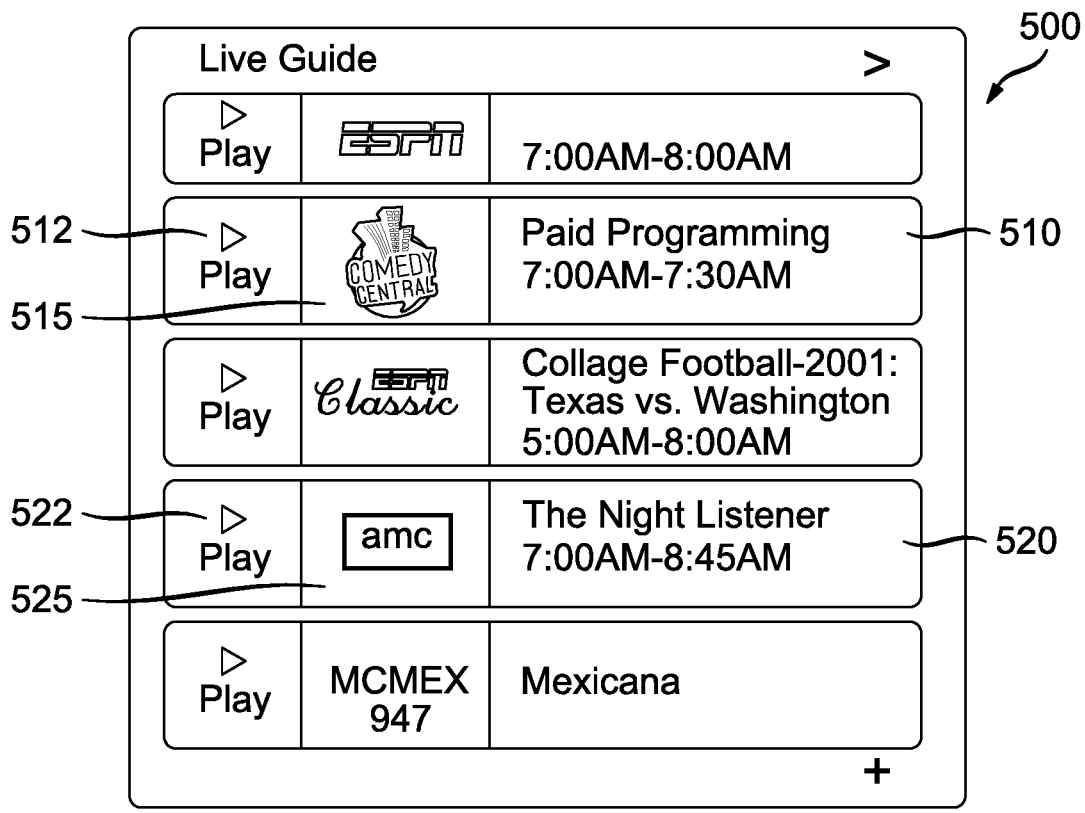
FIG. 5 illustrates an exemplary embodiment of a first card user interface of the present disclosure.

FIG. 5 illustrates an exemplary embodiment of an interface known as a card, where various applications are presented within such a card interface. For example, live television guide application that represents different television listings are presented within card interface 500. That is, the card functions as a window that displays a representation of the application being run. Such cards can be presented on a device including a tablet, a media player, a phone, a monitor, a computer, and any other device that has a display. Cards can represent different applications such as electronic program guides, playlists, social media interfaces, games, video, audio, web pages, browsers, rendered media services, and the like.

Returning to card interface 500, cell 510 displays information about a television show, in this example an infomercial, being broadcasted on a broadcast channel called Comedy Central. Play control 512 when activated using a gesture will cause a tuner in a device such as a set top box, tablet, television, and the like, to tune to a requested channel. Graphic 515 such as a logo comports to the broadcast channel that can be tuned to by activating play control 512. Cell 520 displays information for a television show called The Night Listener which is being broadcasted on American Movie Classics (AMC) which is indicated by graphic 525. If a user wants to tune to AMC, play control 522 can be activated with a gesture. The result of the activation of play controls 512, 522 leads to the outputting of a tuned channel to a display or recording device.

Figure 6:
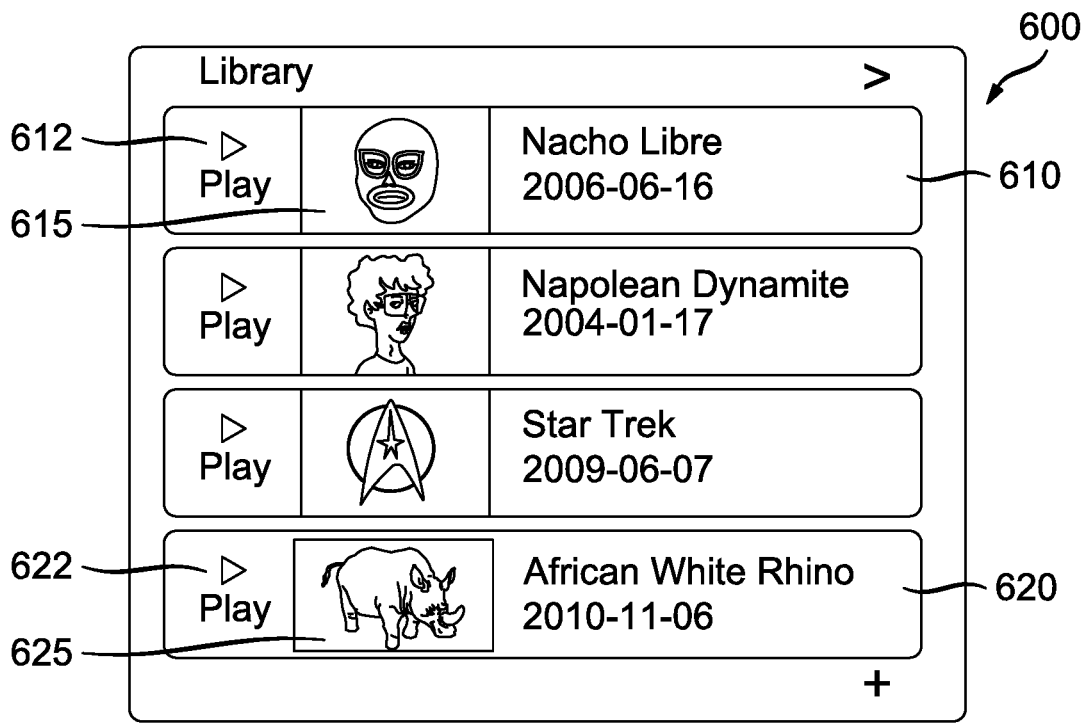
FIG. 6 illustrates an exemplary embodiment of an second card user interface of the present disclosure.

FIG. 6 is an exemplary embodiment of a card interface 600 for another application that represents different media assets (video, audio, pictures, and the like) that are available for playback. Specifically, such media assets can be stored in a content source such as local storage medium, a remote storage medium, an on-demand media service such as video on demand, over the top media service, and the like, where a media asset is delivered to a media device when requested. For example, in response to the activation of play control 612, the media asset Nacho Libre as indicated by cell 610 can be played back using the exemplary architecture as described for FIG. 1. Similarly, a media asset identified as African White Rhino in cell 620 can be played when play control 622 is activated with a gesture.

Graphics 612 and 625 represent thumbnails, poster art, logo, icon, and the like that are used to identify a media asset whereby graphic 612 represents Nacho Libre while graphic element 625 represents African White Rhino. Such graphics can be linked to a media asset by an association made by a user, program guide information that specifies a particular graphic, a screenshot from a media file, and the like.

Figure 7:
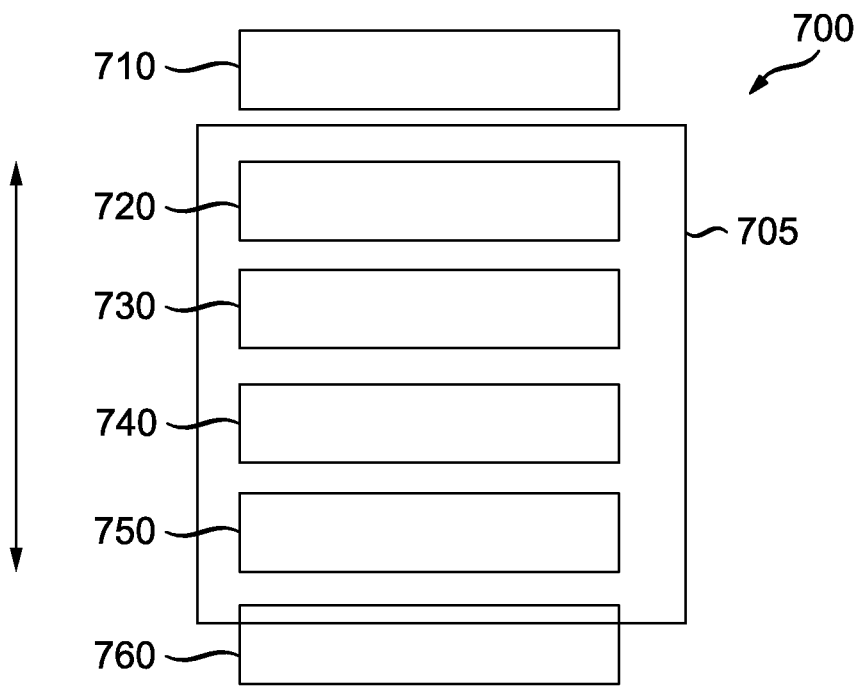
FIG. 7 illustrates an exemplary embodiment of a first manipulation of a card user interface of the present disclosure.

FIG. 7 is an exemplary embodiment of a card interface 700 that is manipulated by a gesture or an action by an input device. Card interface 700 has a display area 705 which is the part of the card or window that can be viewed. Sometimes there may be more elements where a card may have more elements than can be displayed in display area 705 at one time. For example, cell 710 is not displayed for card interface 700 while cells 720, 730, 740, 750, and part of cell 760 are viewable in display area 705.

Figure 8:
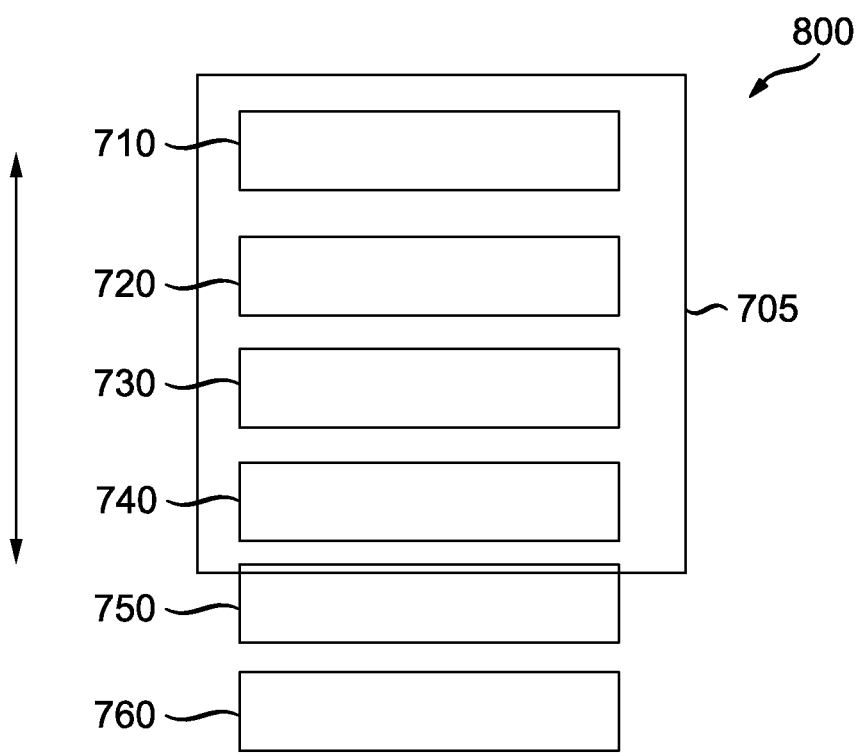
FIG. 8 illustrates an exemplary embodiment of an second manipulation of a card interface of the present disclosure.

Cards can be manipulated in a vertical direction using a gesture or control input, where cells that are displayed are capable of being shown in response to such a gesture of control in an up or down motion. When card interface 800 from FIG. 8 is subjected to a downward gesture and/or control input, as an manipulation, display area 705 will show cell 710, while cell 760 is moved down so far as not to be viewable. Likewise part of cell 750 is not displayed in response to the downward gesture/control input. Cells 750 and 760 can be viewed again in display area 705 if one operates card interface 800 in an upward gesture, as a manipulation, to yield the arrangement of cells shown in card interface 700.

Figure 9:
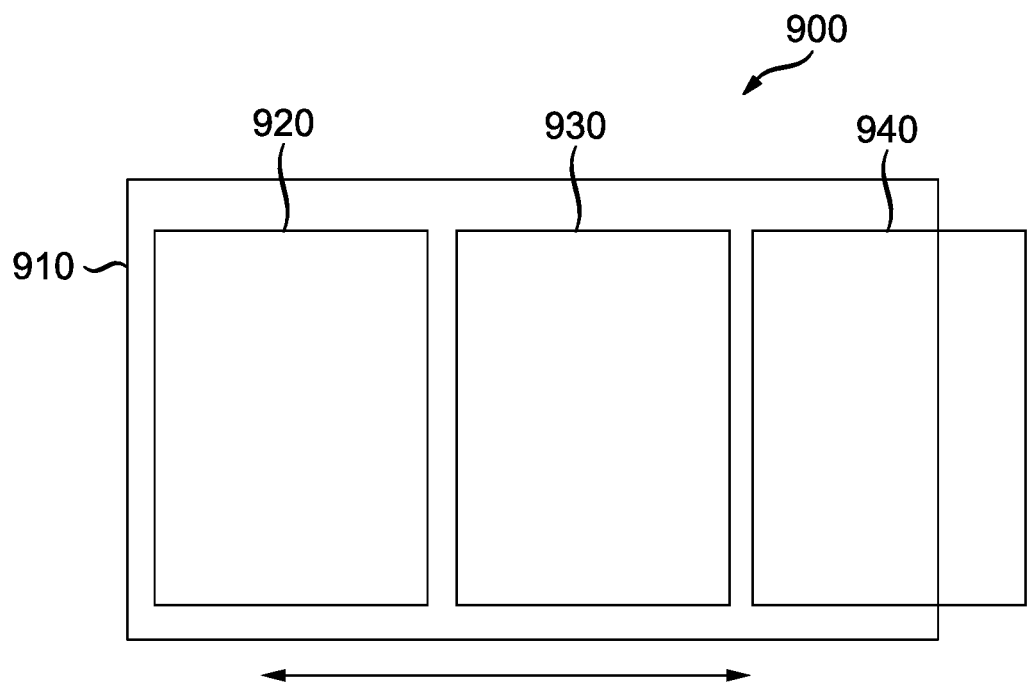
FIG. 9 illustrates an exemplary embodiment of a first manipulation of multiple card interfaces when present on a display device in accordance with the present disclosure.
Figure 10:
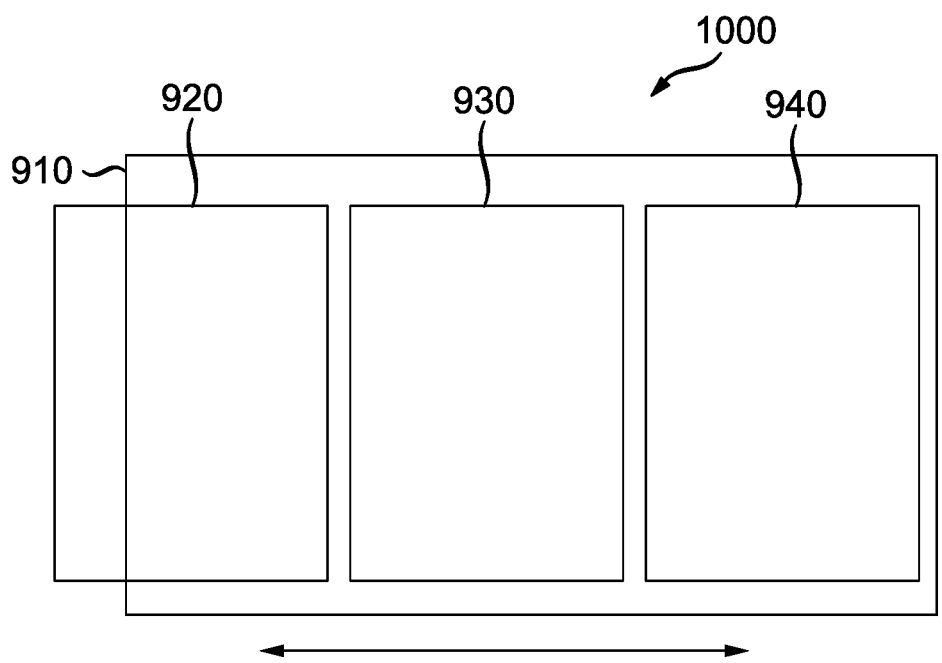
FIG. 10 illustrates an exemplary embodiment of a second manipulation of multiple card interfaces when present on a display device in accordance with the present disclosure.

FIG. 9 is an exemplary embodiment of user interface 900 of a device that presents multiple card interfaces. In this illustrative embodiment, display area 910 displays multiple cards 920, 930, and 940 which can be manipulated in a horizontal direction in response to a gesture and/or control input, where part of card 940 is not displayed in display area 910. If one manipulates display area 910 towards the left with a gesture/control input, the result is shown in FIG. 10 for user interface 1000 where card 940 is completely shown in display area 910 while part of card 920 is not displayed. If one were to move display area 910 to the right with a gesture/control input, the result is shown in FIG. 9, where card 920 is completely shown in display area 910 while part of card 940 is not displayed.

Figure 11:
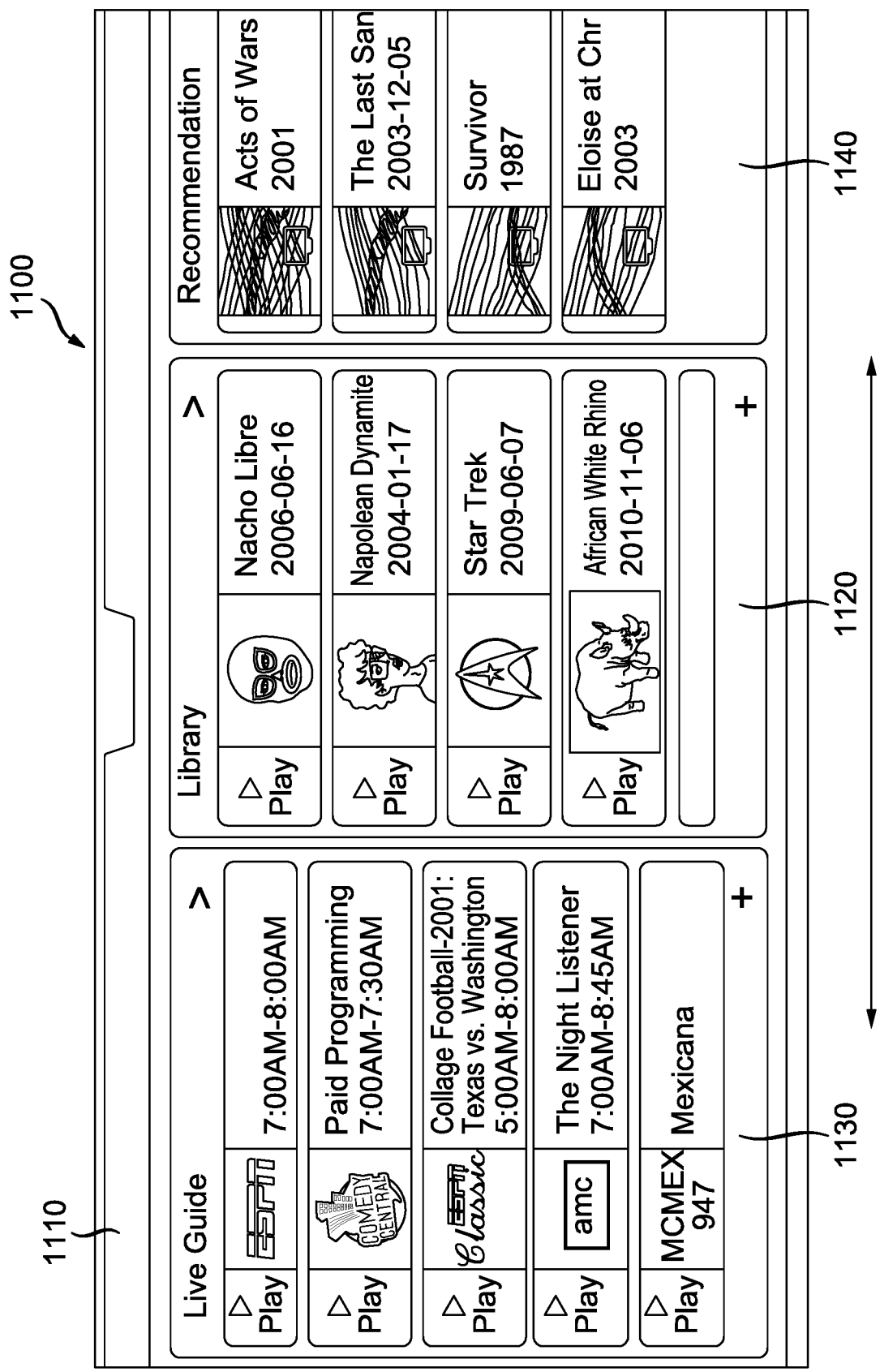
FIG. 11 illustrates an exemplary embodiment of a first manipulation of multiple card interfaces when present on a display device in accordance with the present disclosure.
Figure 12:
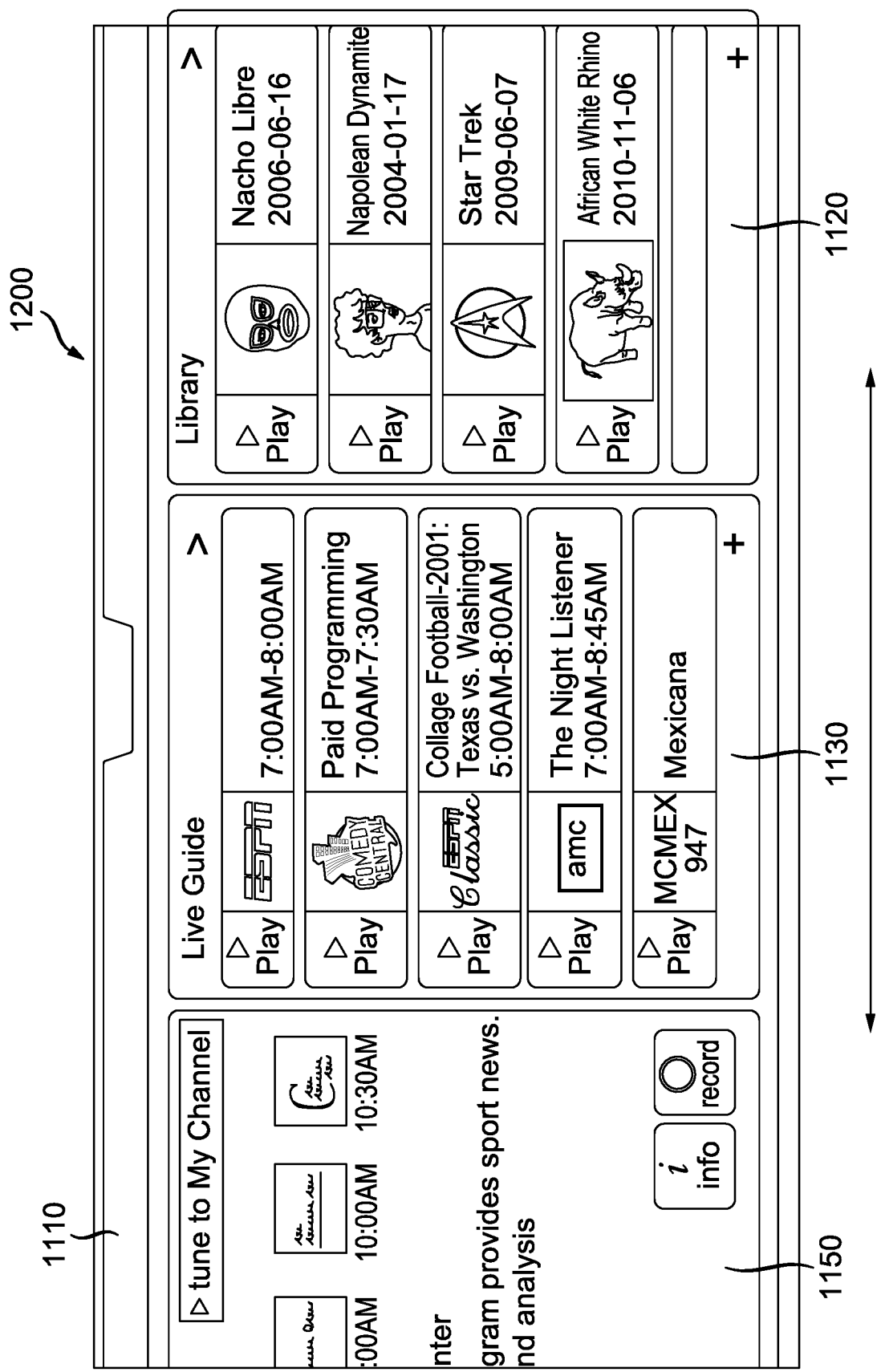
FIG. 12 illustrates an exemplary embodiment of second manipulation of multiple card interfaces when present on a display device in accordance with the present disclosure.

FIG. 11 displays an alternative embodiment of a multiple card interfaces shown in user interface 1100 that is subjected to a manipulation. Specifically, cards 1120, 1130, and 1140, are shown in display area 1110. These cards in response to a gesture/control input in the right direction will result in user interface 1200 shown in FIG. 12. That is, user interface 1200 shows that cards 1120 and 1130 are moved to the right, as to show a new card 1150 in display area 1110. If display area 1110 in FIG. 12 is moved to the left in response to a gesture/control interface, card 1150 will not be displayed while card 1120 becomes visible in display area 1110 as shown in FIG. 11.

Figure 13:
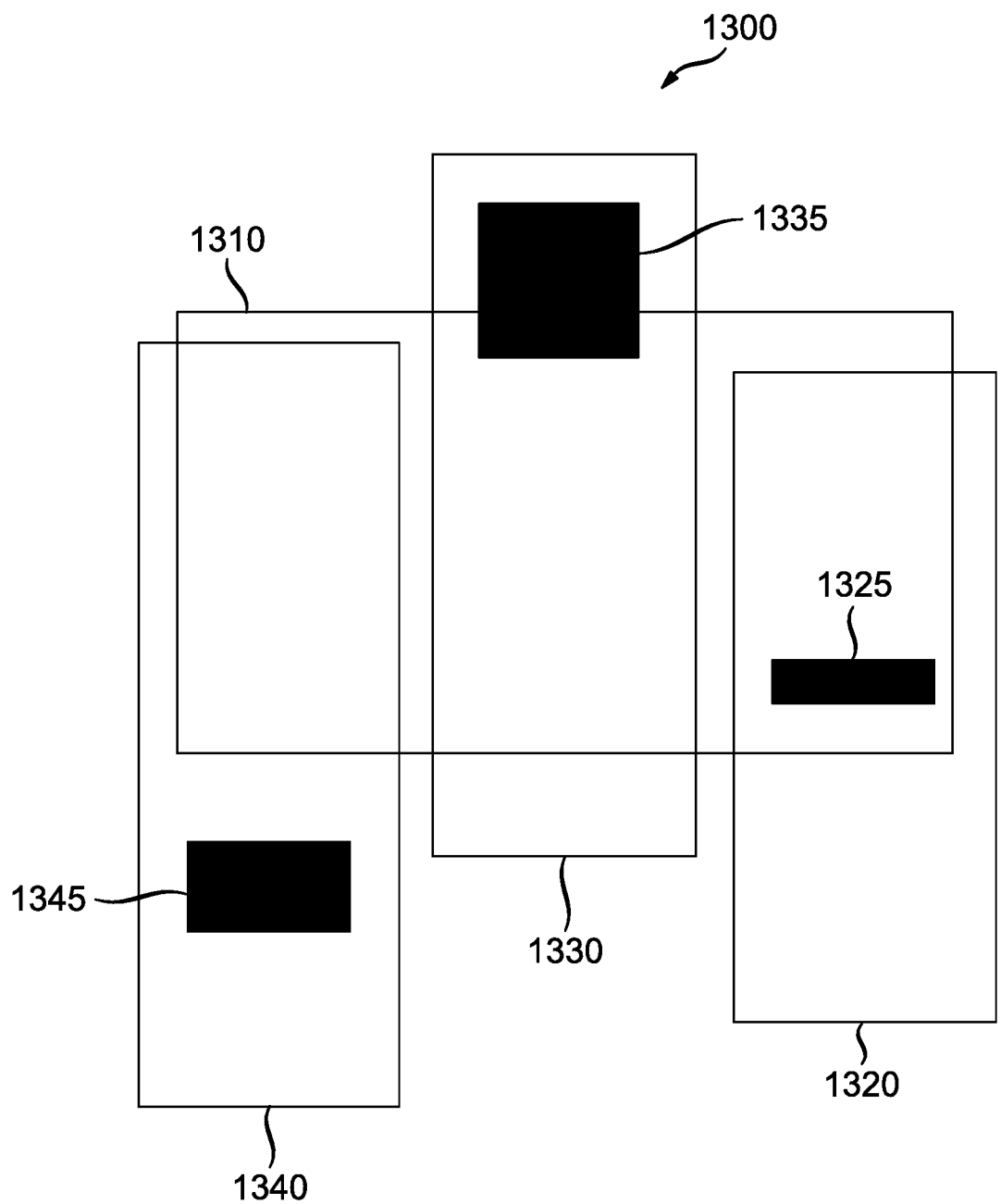
FIG. 13 illustrates an exemplary embodiments of applying a region of interest feature to multiple cards interfaces when present on a display device in accordance with the present disclosure.

FIG. 13 displays an illustrative embodiment of implementing an interest feature across multiple card interfaces that a user can use for locating various items of interest. That is, user interface 1300 displays three cards 1320, 1330, and 1340 which have various regions of interest that a user has interest in. The interest feature can be activated by enabling a command, gesture, control interface, and the like. That is, the interest feature can be activated in response to a user action to cause an automatic result where such items or regions of interest are located without having to have a user search through all of the displayed cards.

Regions of interest 1325, 1335, and 1345 be developed in accordance with a user profile where a user can indicate that they have particular interests in actors, television shows, directors, sports teams, music, and the like where such attributes can be stored in a database. An architecture as shown in FIG. 1 can use these user attributes and apply a search algorithm to find text, pictures, and the like which can be present on different cards. A display device will then attempt to show such areas of interest by rearranging such cards in response to the activation of the interest feature.

Referring to FIG. 13, display area 1310 has a card 1320 with an interest region 1325 that is towards the bottom of the card 1320. Card interface 1330 shows that a region of interest 1335 is towards the top of the card where most of region of interest 1335 is not visible in display area 1310. Card interface 1340 presents a case where the region of interest 1345 is below the display area 1310. This means that region of interest 1345 is not seen because it is not within display area 1310.

Figure 14:
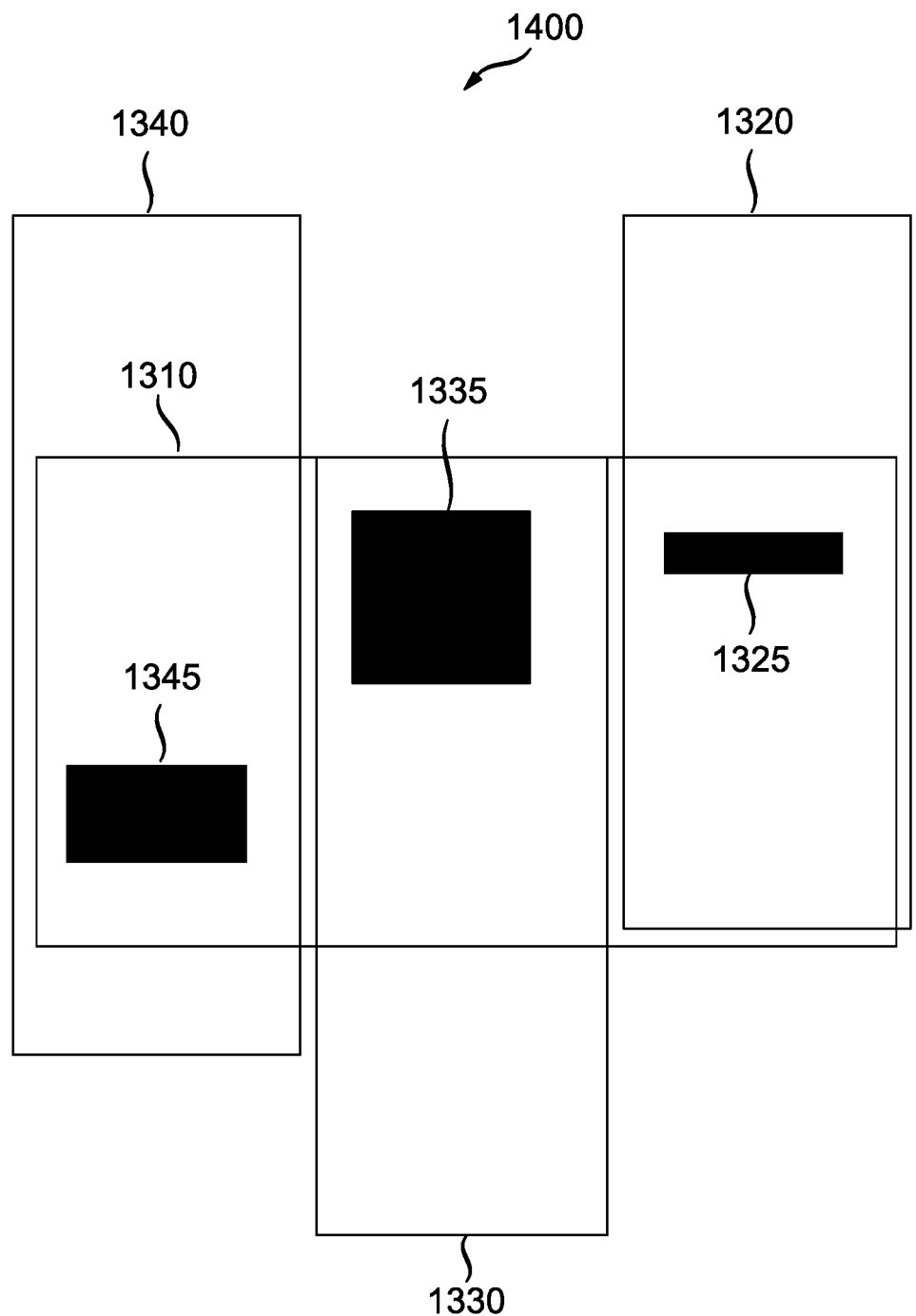
FIG. 14 illustrates an exemplary embodiments of applying a region of interest feature to multiple cards interfaces when present on a display device in accordance with the present disclosure.

FIG. 14 presents an embodiment 1400 of the application of the interest feature where multiple cards are automatically moved to show regions of interest in a display area 1310. That is, card 1320 is moved towards the top as to have region of interest 1325 moved towards the upper part of display area 1310. In contrast, in order to show region of interest 1335, card 1330 is moved down so that region of 1335 is now visible. Card 1340 is automatically moved in an up direction as to have region of interest 1345 displayed in display area 1310.

Figure 15:
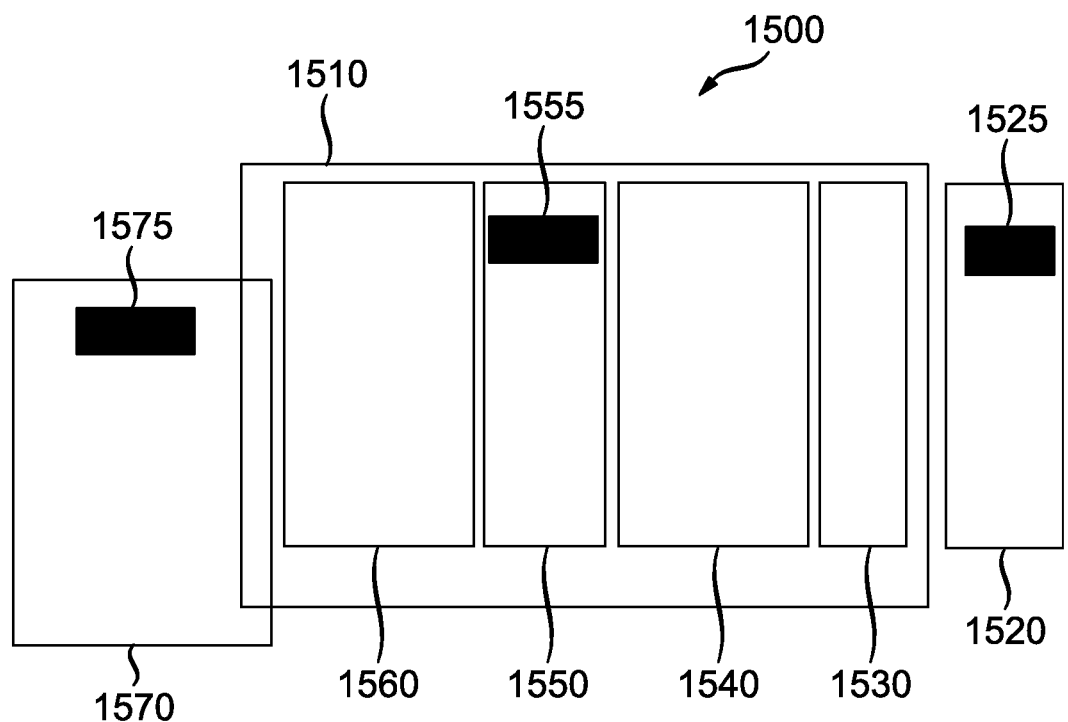
FIG. 15 illustrates an exemplary alternative embodiment of applying a region of interest feature to multiple cards shown on a display device in accordance with the present disclosure.
Figure 16:
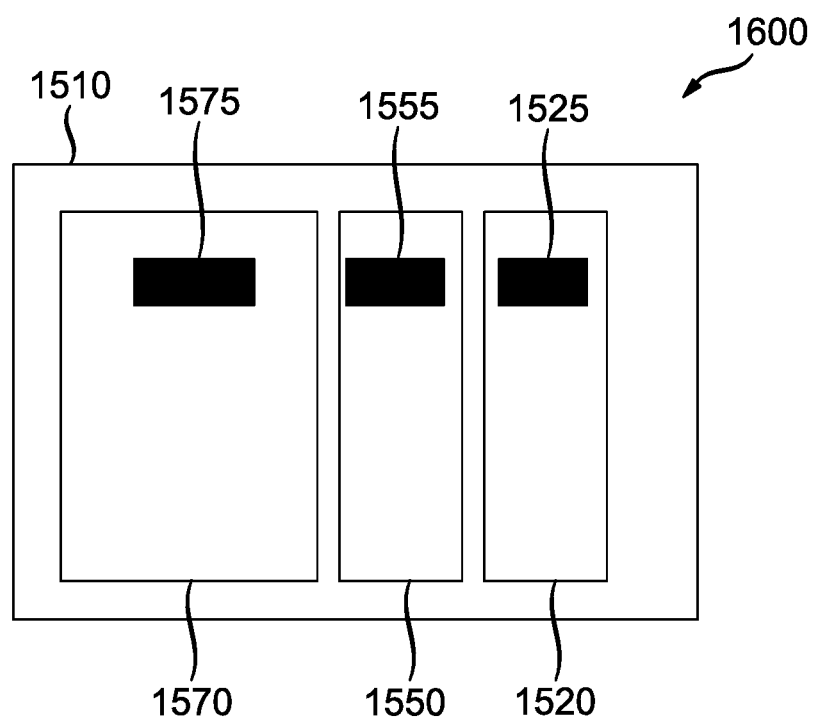
FIG. 16 illustrates an exemplary alternative embodiment of applying a region of interest feature to multiple cards shown on a display device in accordance with the present disclosure.

FIGS. 15 and 16 show an alternative embodiment for the application of the interest feature. In FIG. 15, a user interface 1500 with multiple cards with various sizes is shown. In the example, cards 1520, 1550, and 1570 have regions of interest 1525, 1555, and 1575, respectively. The problem with the presentation of display area 1510 is that cards 1520 and 1570 are not visible, while card 1550 can be seen. That is, display area 1510 has cards 1530, 1540, and 1560 which do not any areas of interest. When the interest feature as previously described is activated, the results are shown in FIG. 16 where cards 1520 and 1570 are moved to display area 1570 by having the intervening cards 1530, 1540, and 1560 deleted/removed from display area 1570.

Figure 17:
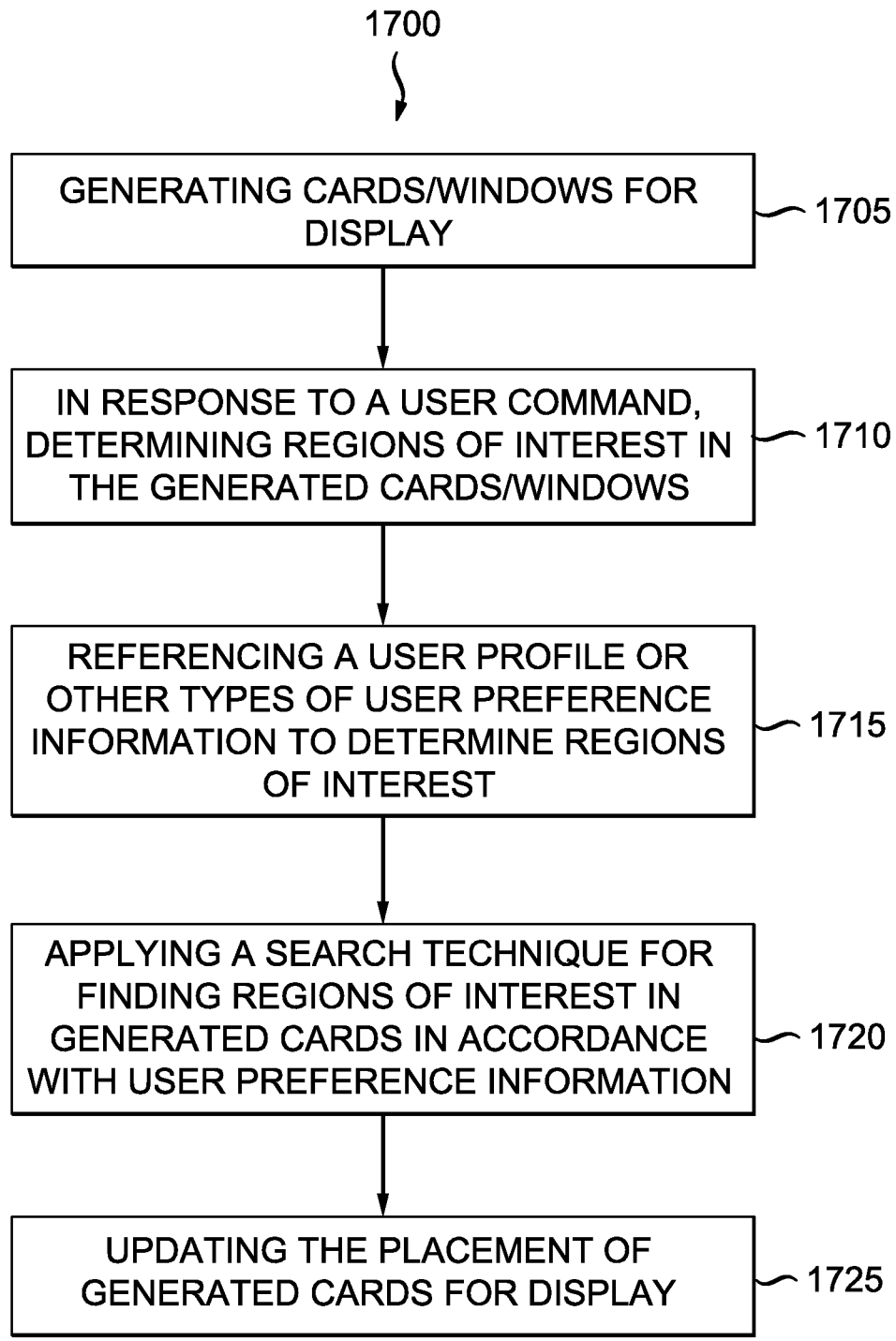
FIG. 17 presents a flow chart for determining regions of interest as to update the presentation of displayed cards in accordance with the present disclosure.

FIG. 17 presents a flow chart 1700 for determining regions of interest as to update the presentation of displayed cards in accordance with the present disclosure. A controller 214 within media device 200 can be used to implement this process using computer code, although such a method can also be implemented using other types of devices, client server relationship, and the like.

In step 1705, a media device 200 configures and generates cards or windows for display as shown in FIGS. 5-12, for example. In response to a user command, step 1710 activates a function of determining regions of interest in the generated cards/windows in a media device 200. Specifically, in response to a gesture/control input command, media device 200 will initiate an action of determining what constitutes a region of interest.

Step 1715 has a media device 200 determining topics, metadata, graphics, and the like as a region of interest in accordance with user preference information. Such information can be determining by using a user profile where a user explicitly lists keywords or indicates various subjects that the user has interest (i.e., I like baseball, I hate hockey). Other approaches can determine user preference information in accordance with how a user interfaces with media device 200 or other devices, where video and audio media that are accessed more are assumed to be more relevant to a user than video and audio media that are accessed infrequently by a user. Other preference techniques can be used for determining a user's preferences can be applied in accordance with the described principles. In the present example, metadata or keywords can be generated as part of the user preference information, although other types of data can be used as well.

Step 1720 then uses the results of such determined user preference information and applies a search function to find such information if present on the displayed cards/windows. For example, if keywords are developed from step 1715, a search function looking for such keywords in the text present on cards can be used to determine a region of interest. Similarly, if there is metadata that is associated with a graphic present on a card, a keyword that matches such metadata would indicate that such a graphic would be potentially a region of interest. Other search techniques can be applied for matching up regions of interest can be applied in accordance with the described principles.

Step 1725 modifies the windows/cards for display. Once the regions of interest are determined in step 1720, step 1725 uses this information to determine what cards have regions of interest. The cards that have regions of interest are moved up or down by media device 200 as to show such regions of interest in a manner as illustrated in FIGS. 13-16. In addition, if there are cards that do not possess any regions of interest, such cards can be optionally closed and removed from a display area. The display area can then be updated with new cards that have regions of interest, as determined in previous steps 1710-1720.

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes that can be substantially represented in computer readable media and so executed by a computer or processor, whether or not such computer or processor is explicitly shown. The computer readable media and code written on can be implemented in a transitory state (signal) and a non-transitory state (e.g., on a tangible medium such as CD-ROM, DVD, Blu-Ray, Hard Drive, flash card, or other type of tangible storage medium).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. It is noted that modifications and variations can be made by persons skilled in the art in light of the above teachings.

The invention claimed is:

1. A method comprising:
    determining, in response to a user command, regions of interest within each of a plurality of cards by searching information indicating previous user preferences; and
    updating for display the plurality of cards to visibly show in a display area of a display device the at least one region of interest of multiple cards included in a first group of the plurality of cards, wherein said updating includes repositioning the plurality of cards to remove cards not included in the first group from the display area and to visibly display the at least one region of interest within all of the multiple cards included in the first group within the display area of the display device.

2. The method of claim 1, wherein the at least one region of interest is determined from user preference information.

3. The method of claim 2, wherein the user preference information comes from at least one or a user profile, prior user activity with media, and explicit user inputs.

4. The method of claim 1, wherein the repositioning further comprises moving the multiple cards in an up or down direction to visibly show the at least one region of interest in all of the multiple cards.

5. The method of claim 4, wherein the updating for display has a first card and a second card included in the multiple cards being moved in opposite directions when visibly showing first and second regions of interest included in the first and second cards, respectively.

6. The method of claim 4, wherein the updating for display has a first card and a second card included in the multiple cards being moved in the same direction when visibly showing first and second regions of interest included in the first and second cards, respectively.

7. Apparatus comprising one or more processors configured to:
    determine, in response to a user command, regions of interest within each of a plurality of cards by searching information indicating previous user preferences; and
    update for display the plurality of cards to visibly show in a display area of a display device the at least one region of interest of multiple cards included a first group of the plurality of cards, wherein said updating including repositioning the plurality of cards to remove cards not included in the first group from the display area and to visibly display the at least one region of interest within all of the multiple cards included in the first group within the display area of the display device.

8. The apparatus of claim 7, wherein the at least one region of interest is determined from user preference information.

9. The apparatus of claim 8, wherein the user preference information comes from at least one or a user profile, prior user activity with media, and explicit user inputs.

10. The apparatus of claim 7, wherein the repositioning further comprises moving the multiple cards in an up or down direction to visibly show the at least one region of interest in all of the multiple cards.

11. The apparatus of claim 10, wherein the updating for display has a first card and a second card included in the multiple cards being moved in opposite directions when visibly showing first and second regions of interest included in the first and second cards, respectively.

12. The apparatus of claim 10, wherein the updating for display has a first card and a second card included in the multiple cards being moved in the same direction when visibly showing first and second regions of interest included in the first and second cards, respectively.

13. A non-transitory computer-readable medium storing executable program instructions to cause a computer executing the instructions to perform a method comprising:
    determining, in response to a user command, regions of interest within each of a plurality of cards by searching information indicating previous user preferences; and
    updating for display the plurality of cards to visibly show in a display area of a display device the at least one region of interest of multiple cards included in a first group of the plurality of cards, wherein said updating includes repositioning the plurality of cards to remove cards not included in the first group from the display area and to visibly display the at least one region of interest within all of the multiple cards included in the first group within the display area of the display device.

14. The non-transitory computer-readable medium of claim 13, wherein the at least one region of interest is determined from user preference information.

15. The non-transitory computer-readable medium of claim 14, wherein the user preference information comes from at least one or a user profile, prior user activity with media, and explicit user inputs.

16. The non-transitory computer-readable medium of claim 13, wherein the repositioning further comprises moving the multiple cards in an up or down direction to visibly show the at least one region of interest in all of the multiple cards.

17. The non-transitory computer-readable medium of claim 16, wherein the updating for display has a first card and a second card included in the multiple cards being moved in opposite directions when visibly showing first and second regions of interest included in the first and second cards, respectively.

18. The non-transitory computer-readable medium of claim 16, wherein the updating for display has a first card and a second card included in the multiple cards being moved in the same direction when visibly showing first and second regions of interest included in the first and second cards, respectively.

* * * * *